April 21, 1936.  L. S. CHALATOW  2,037,879

LIQUID LEVEL INDICATOR

Original Filed Sept. 22, 1932

INVENTOR.
Leon Sergius Chalatow

Patented Apr. 21, 1936

2,037,879

UNITED STATES PATENT OFFICE 2,037,879

LIQUID LEVEL INDICATOR

Leon Sergius Chalatow, Boston, Mass., assignor to Philip A. Jerguson, Medford, Mass.

Application September 22, 1932, Serial No. 634,347
Renewed September 14, 1935

7 Claims. (Cl. 73—54)

My present invention relates to improvements in liquid level indicators that indicate by weighing the liquid and use a container of cylindrical or other suitable shape in communication with the liquid receptacle and a scale mechanism supporting the cylinder.

The object of my invention is to provide a single instrument that will function correctly at more than one boiler pressure.

This invention is illustrated in the drawing and hereafter more fully described.

On the drawing

Similar numerals refer to similar parts through several views.

Figure 1:
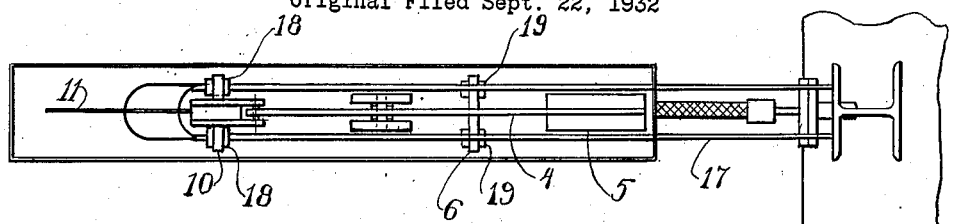
Fig. 1 is top plan view of said embodiment as it appears after the removal of the top of the box.
Figure 2:
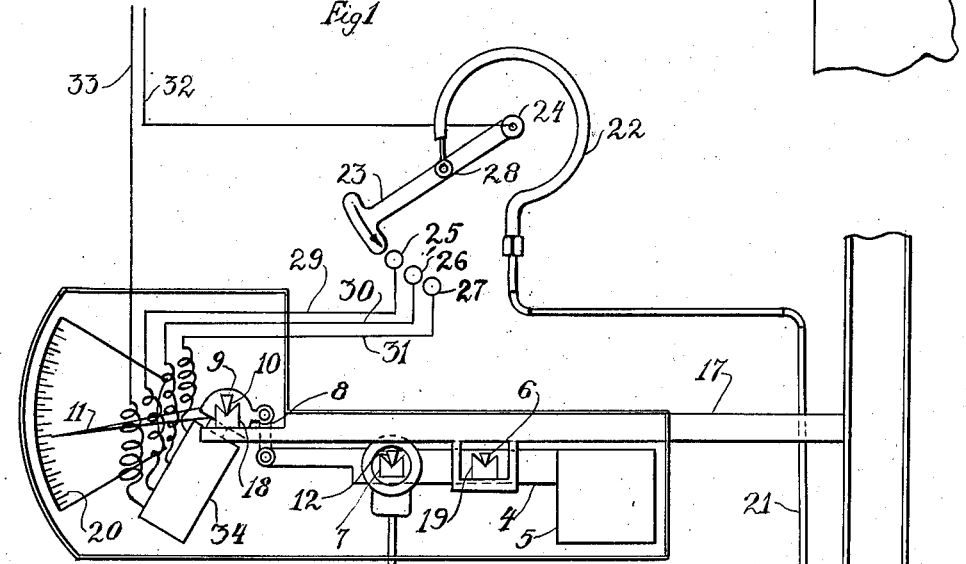
Fig. 2 is a side elevation of said embodiment as it appears after the removal of the side of the box.
Figure 3:
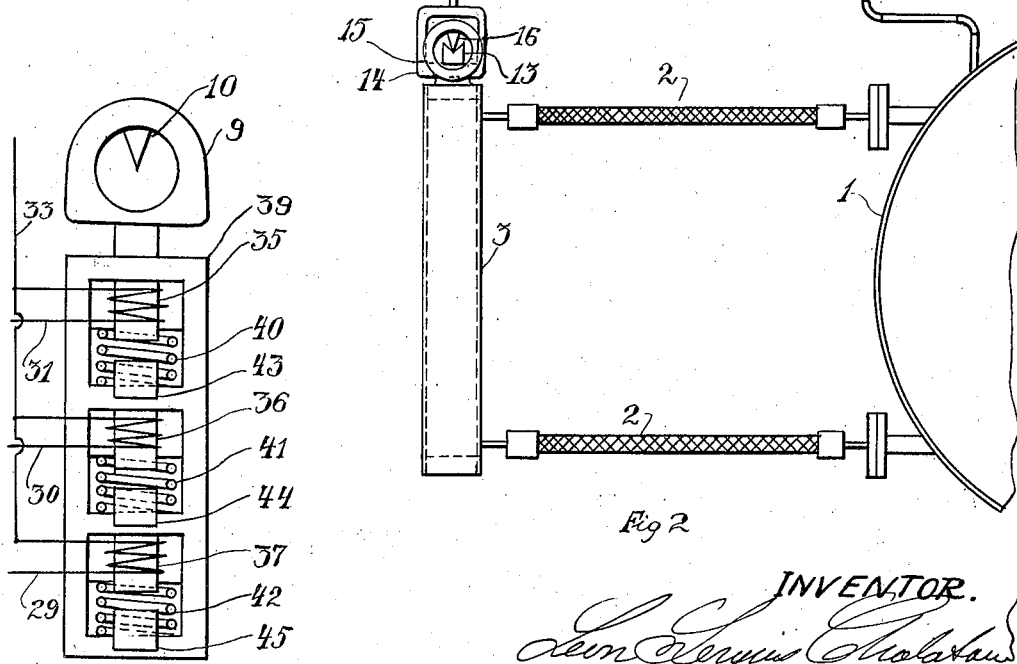
Fig. 3 is a detailed view of the compensating pendulum as it appears after the removal of the pendulum cover.

The gauging instrumentalities comprise a weighing cylinder 3, two rings 15 rigidly connected to said cylinder, a rectangular frame 14 which is located between said rings and an agate bearing 13 rigidly connected to said frame. A knife pivot 16 is rigidly connected to the rings 15 and is free to oscillate in the agate bearing 13 which agate bearing is supporting the cylinder. The knife pivot 12 is free to oscillate in the agate bearing 7 which bearing is rigidly connected to a scale beam 4. The frame 14 is rigidly connected to the knife pivot 16 and thus flexibly suspends the cylinder from said scale beam. Said beam also has a knife pivot 6 rigidly connected to it and which is free to oscillate in agate bearings 19. Said bearings are supported by frame 17, said frame being connected by suitable means to some structure, for example, the one supporting the boiler.

The weighing cylinder 3 has communication with the interior of the boiler by means of flexible tubes 2. Counterweight 5 is attached to one end of the scale beam and link 8 to the opposite end and connects said beam to pendulum 9. Pendulum 9 with knife pivot 10, which is rigidly connected to it, is free to oscillate in agate bearings 18, said bearings being supported by frame 17.

21 is a tube connecting the steam space of the boiler to the Bourdon tube 22. Link 23 is pivoted on a fixed pivot 24, its free end when moving in the direction of the arrow contacting with consecutive electrical contacts 25, 26, and 27. The point 28 of the said link is connected to the free end of the Bourdon tube. Wires 29, 30 and 31 lead to solenoids 35, 36 and 37, and together with wire 33 carry electrical current to said solenoids after contacts 25, 26 and 27 are made. The solenoids are free to move in the frame 39, said frame being made of non-magnetic material. Solenoids are kept in their uppermost position by spiral springs 40, 41 and 42; 43, 44 and 45 are iron armatures to which corresponding solenoids are attached after the current passes through the windings of said solenoids.

It will be understood from the description so far that the water supplied to the boiler will flow without restraint through pipe 2 into the weighing cylinder 3, and will rise therein to a certain level, causing the cylinder to descend against the momentum of the pendulum 9. In order to indicate the level of the water entering the weighing cylinder, and hence the level of the water in the boiler, the following instrumentalities are used.

Upon the pendulum is arranged an indicating hand 11 and a dial is rigidly connected through the box to the frame. It will be obvious that as the weighing cylinder 3 moves in either direction that this movement is communicated to the scale beam 4 and through the link 8 to the pendulum, and to the indicating hand 11, causing the latter to move upon the dial. As the level of the liquid rises or falls, the cylinder will (due to the change in weight) move up or down and this motion will be followed by the bending of the flexible tubes connecting the cylinder to the boiler.

By suitably proportioning the parts, such as changing the weight of the pendulum and the distance of its center of gravity from the pivot point, the extent of the movement of the indicating hand 8, over the dial can be governed.

The weight of the cylinder proper of the flexible tubes and parts attached to the cylinder is balanced by the counterweight 5.

It is evident that this apparatus could be made to read correctly for a certain boiler pressure with its corresponding temperature and corresponding weight of the liquid per cubic inch.

As the pressure in the boiler, and consequently the temperature for which the pendulum was calibrated, drops down, the specific gravity of the water in the cylinder will increase and the indicating hand will move more than through one inch division for one inch of boiler water level rise. When the pressure drops to a specified lower pressure, the Bourdon tube will close a sufficient amount to move the link 23 and close the first contact 25, thus sending current through the winding of the first solenoid 35, said solenoid will be attracted to the corresponding armature 43, against the resistance of the spring 40.

This will increase the distance of the center of gravity of the pendulum from its pivot point.

As the pressure drops still further, the same sequence of events will take place in relation to 2nd, 3rd, etc., solenoids.

By properly proportioning the weight of the solenoids, the distances of their center of gravity from the pivot point of the pendulum and the distance of the solenoids from the iron armatures, the indicator can be made to read correctly for as many pressures as there are solenoids.

Having thus described my invention, what I claim as new herein and desire to secure Letters Patent is:

1. In a water level gauge for a boiler, a container, means flexibly connecting said container to the boiler whereby water enters the container in accordance with the liquid level in the boiler, a scale including a pendulum, means connecting the container to said scale to actuate said scale and pendulum in accordance with the weight of liquid in said container, movable solenoids in said pendulum effective to change the moment of said pendulum, a pressure gauge connected to said boiler and including electrical contacts, said contacts being connected to said solenoids whereby the movement of said pressure gauge will close said contacts to move said solenoids in accordance with the pressure and temperature within said boiler.

2. In a water level gauge for a boiler, a container, means flexibly connecting said container to the boiler whereby water enters the container in accordance with the liquid level in the boiler, a scale including a pendulum, means connecting the container to said scale to actuate said scale and pendulum in accordance with the weight of liquid in said container, said pendulum being made of non-magnetic material, one or more armatures in said pendulum and rigidly connected to the frame of the pendulum, one movable solenoid opposite each armature, a spring imposed between each armature and each solenoid, a pressure gauge connected to said boiler and including electrical contacts, said contacts being connected to said solenoids whereby the movement of said pressure gauge will close said contacts to move said solenoids to change the moment of the pendulum in accordance with the pressure and temperature within said boiler.

3. In a water level gauge for a boiler, a container, means flexibly connecting said container to the boiler whereby water enters the container in accordance with the liquid level in the boiler, a scale including a pendulum, means connecting the container to said scale to actuate said scale and pendulum in accordance with the weight of liquid in said container, said pendulum being made of non-magnetic material, one or more armatures in said pendulum and rigidly connected to the frame of the pendulum, one movable solenoid opposite each armature, a spring imposed between each armature and each solenoid, a Bourdon tube connected to said boiler and including electrical contacts, said contacts being connected to said solenoid whereby the movement of said Bourdon tube will close said contacts to move said solenoids to change the moment of the pendulum in accordance with the pressure and temperature within said boiler.

4. Mechanism for measuring the height of water in a boiler comprising a container, connections to place the same in communication with the boiler permitting the container to move under gravity substantially unimpeded by said connections, movable counterbalancing means supporting the container and means responsive to temperature conditions in the boiler for controlling the movement of said counterbalancing means to compensate for variations of weight in the container caused by variations in temperatures of the boiler fluid.

5. Mechanism for measuring the height of water in a boiler comprising a container, connections to place the same in communication with the boiler permitting the container to move under gravity substantially unimpeded by said connections, movable counterbalancing means supporting the container comprising a beam, a depending arm rotated thereby, a weight shiftable along said arm and means responsive to temperature conditions in the boiler for shifting the weight along the arm to compensate for variations in weight of the fluid in the container caused by variations in temperatures of the boiler fluid.

6. In a water level gauge, a container flexibly connected to a boiler and subject to the liquid level of the boiler, a scale supporting said container, a counterpoise for said scale, said counterpoise including a movable element to change the effective influence of said counterpoise on said scale, controlling means for said movable element, a temperature responsive means connected to said boiler and responsive to temperature changes of the fluid in said boiler and means connecting said temperature responsive means and said controlling means whereby said counterpoise will be operated under the control of said temperature responsive means to counterbalance the increased unit weight of water in said container caused by a drop in temperature of the water in said boiler.

7. In a device of the class described, liquid level means operatively connected to a tank, weighing means supporting said liquid level means and including a variable counterpoise, means connected to said tank and responsive to the temperature of the fluid in said tank, and means controlled by said temperature responsive means for operating said variable counterpoise to offset the increased unit weight of liquid in said liquid level means due to a drop in temperature of said boiler fluid.

LEON SERGIUS CHALATOW.